US008566358B2

(12) United States Patent
Lane et al.

(10) Patent No.: US 8,566,358 B2
(45) Date of Patent: Oct. 22, 2013

(54) FRAMEWORK TO POPULATE AND MAINTAIN A SERVICE ORIENTED ARCHITECTURE INDUSTRY MODEL REPOSITORY

(75) Inventors: Eoin Lane, Littleton, MA (US); Mei Yang Selvage, Pocatello, ID (US); Magda Mahmoud Mourad, Yorktown Heights, NY (US); Harry T. Pendergrass, Aloha, OR (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 12/640,749

(22) Filed: Dec. 17, 2009

(65) Prior Publication Data

US 2011/0153292 A1 Jun. 23, 2011

(51) Int. Cl.
*G06F 17/30* (2006.01)
(52) U.S. Cl.
USPC ............ 707/792; 707/802; 707/803; 707/804
(58) Field of Classification Search
USPC .................................. 707/809, 769, 802–804
See application file for complete search history.

(56) References Cited

U.S. PATENT DOCUMENTS

| 6,256,773 | B1  |   | 7/2001 | Bowman-Amuah |
| 6,363,353 | B1  | * | 3/2002 | Chen ............................ 705/7.29 |
| 6,377,934 | B1  | * | 4/2002 | Chen et al. ................... 705/7.29 |
| 6,411,961 | B1  | * | 6/2002 | Chen .................................... 1/1 |
| 6,539,396 | B1  | * | 3/2003 | Bowman-Amuah .......... 707/769 |
| 6,658,644 | B1  |   | 12/2003 | Bishop et al. |
| 6,799,174 | B2  |   | 9/2004 | Chipman et al. |
| 7,080,064 | B2  |   | 7/2006 | Sundaresan |
| 7,099,859 | B2  |   | 8/2006 | Sundaresan |
| 7,103,871 | B1  |   | 9/2006 | Kirkpatrick et al. |
| 7,225,241 | B2  |   | 5/2007 | Yada |
| 7,318,055 | B2  |   | 1/2008 | Britton et al. |
| 7,366,706 | B2  |   | 4/2008 | Chang et al. |

(Continued)

FOREIGN PATENT DOCUMENTS

WO      2007113164      10/2007

OTHER PUBLICATIONS

Dinesh et al., Oracle® Enterprise Repository, User Guide, 10g Release 3 (10.3), Jul. 2009, Oracle Corporation, pp. 5, 7, 10-11, 18-19, 21, 37-38, 61, 71, 77, 82, 84.*

(Continued)

*Primary Examiner* — Hanh Thai
(74) *Attorney, Agent, or Firm* — Patents on Demand P.A.; Brian K. Buchheit; Scott M. Garrett

(57) ABSTRACT

A method for building a service oriented architecture industry model repository comprising: creating a meta-meta-meta model with a topic map based index; pre-populating the meta-meta-meta model with a topic map based index using the data from the physical asset repository and known relationships between topics, associations, and occurrences in topic maps within the meta model service; pre-populating an information model repository common meta-meta model comprising reusing a taxonomy specific to an industry vertical as a common ontology for the topic map based index; pre-populating the at least one topic map meta model with data specific to a particular topic or industry vertical from the physical asset repository; and pre-populating models of the at least one topic map meta model with data specific to a particular topic or industry vertical from the physical asset repository.

20 Claims, 10 Drawing Sheets

(56) References Cited

U.S. PATENT DOCUMENTS

| | | | |
|---|---|---|---|
| 7,412,457 | B2 | 8/2008 | Saracco et al. |
| 7,483,973 | B2 | 1/2009 | An et al. |
| 7,526,501 | B2 | 4/2009 | Albahari et al. |
| 7,546,295 | B2 | 6/2009 | Brave et al. |
| 1,260,565 | A1 | 10/2009 | Coldicott et al. |
| 7,890,517 | B2 | 2/2011 | Angelo et al. |
| 7,979,840 | B2 | 7/2011 | Zhang et al. |
| 8,244,768 | B2* | 8/2012 | Lane et al. ............ 707/792 |
| 8,301,490 | B2* | 10/2012 | Cornford ............ 705/7.39 |
| 2002/0069102 | A1 | 6/2002 | Vellante et al. |
| 2002/0073106 | A1 | 6/2002 | Parker et al. |
| 2002/0087315 | A1* | 7/2002 | Lee et al. ............ 704/256 |
| 2002/0116389 | A1* | 8/2002 | Chen et al. ............ 707/103 R |
| 2002/0194053 | A1 | 12/2002 | Barrett et al. |
| 2003/0009740 | A1 | 1/2003 | Lan |
| 2003/0233631 | A1 | 12/2003 | Curry et al. |
| 2004/0172612 | A1 | 9/2004 | Kasravi et al. |
| 2004/0193476 | A1 | 9/2004 | Aerdts |
| 2005/0050311 | A1 | 3/2005 | Joseph et al. |
| 2005/0050549 | A1 | 3/2005 | Joseph et al. |
| 2005/0138113 | A1 | 6/2005 | Brendle et al. |
| 2005/0154662 | A1* | 7/2005 | Langenwalter ............ 705/35 |
| 2005/0166178 | A1 | 7/2005 | Masticola et al. |
| 2005/0278202 | A1 | 12/2005 | Broomhall et al. |
| 2006/0015489 | A1 | 1/2006 | Probst et al. |
| 2006/0047810 | A1 | 3/2006 | Herzog et al. |
| 2006/0070083 | A1 | 3/2006 | Brunswig et al. |
| 2006/0174222 | A1 | 8/2006 | Thonse et al. |
| 2006/0229896 | A1 | 10/2006 | Rosen et al. |
| 2006/0236307 | A1 | 10/2006 | Debruin et al. |
| 2006/0241931 | A1 | 10/2006 | Abu el Ata et al. |
| 2007/0073663 | A1 | 3/2007 | McVeigh et al. |
| 2007/0112712 | A1 | 5/2007 | Flinn et al. |
| 2007/0168479 | A1* | 7/2007 | Bean et al. ............ 709/223 |
| 2007/0239768 | A1 | 10/2007 | Quinn-Jacobs |
| 2007/0260476 | A1* | 11/2007 | Smolen et al. ............ 705/1 |
| 2007/0261027 | A1 | 11/2007 | Dhanakshirur et al. |
| 2007/0271277 | A1 | 11/2007 | Ivan et al. |
| 2008/0059630 | A1 | 3/2008 | Sattler et al. |
| 2008/0114700 | A1 | 5/2008 | Moore et al. |
| 2008/0126397 | A1 | 5/2008 | Alexander et al. |
| 2008/0127047 | A1 | 5/2008 | Zhang et al. |
| 2008/0133558 | A1 | 6/2008 | Carlson et al. |
| 2008/0134137 | A1 | 6/2008 | Petersen |
| 2008/0178147 | A1 | 7/2008 | Meliksetian et al. |
| 2008/0215358 | A1 | 9/2008 | Goldszmidt et al. |
| 2008/0215400 | A1 | 9/2008 | Ban et al. |
| 2008/0229195 | A1 | 9/2008 | Brauel et al. |
| 2008/0255892 | A1* | 10/2008 | Orangi et al. ............ 705/7 |
| 2008/0270372 | A1 | 10/2008 | Hsu et al. |
| 2008/0288944 | A1 | 11/2008 | Coqueret et al. |
| 2009/0064087 | A1 | 3/2009 | Isom |
| 2009/0077043 | A1 | 3/2009 | Chang et al. |
| 2009/0089078 | A1 | 4/2009 | Bursey |
| 2009/0094112 | A1* | 4/2009 | Cesarini et al. ............ 705/14 |
| 2009/0106234 | A1* | 4/2009 | Siedlecki et al. ............ 707/5 |
| 2009/0109225 | A1 | 4/2009 | Srivastava et al. |
| 2009/0112908 | A1 | 4/2009 | Wintel et al. |
| 2009/0132211 | A1 | 5/2009 | Lane et al. |
| 2009/0138293 | A1 | 5/2009 | Lane et al. |
| 2009/0158237 | A1 | 6/2009 | Zhang et al. |
| 2009/0182610 | A1 | 7/2009 | Palanisamy et al. |
| 2009/0182750 | A1 | 7/2009 | Keyes et al. |
| 2009/0193057 | A1 | 7/2009 | Maes |
| 2009/0193432 | A1 | 7/2009 | McKegney et al. |
| 2009/0201917 | A1 | 8/2009 | Maes et al. |
| 2009/0204467 | A1 | 8/2009 | Rubio et al. |
| 2009/0210390 | A1 | 8/2009 | Lane |
| 2009/0254572 | A1* | 10/2009 | Redlich et al. ............ 707/10 |
| 2009/0281996 | A1* | 11/2009 | Liu et al. ............ 707/3 |
| 2010/0057677 | A1* | 3/2010 | Rapp et al. ............ 707/3 |
| 2010/0058113 | A1* | 3/2010 | Rapp et al. ............ 714/38 |
| 2010/0082387 | A1 | 4/2010 | Cao et al. |
| 2010/0106656 | A1 | 4/2010 | Sheth et al. |
| 2010/0145774 | A1* | 6/2010 | Veshnyakov et al. ............ 705/12 |
| 2010/0161629 | A1* | 6/2010 | Palanisamy et al. ............ 707/756 |
| 2010/0250497 | A1* | 9/2010 | Redlich et al. ............ 707/661 |
| 2011/0035391 | A1* | 2/2011 | Werner et al. ............ 707/756 |
| 2011/0099207 | A1* | 4/2011 | Brown et al. ............ 707/803 |
| 2011/0099536 | A1* | 4/2011 | Coldicott et al. ............ 717/120 |
| 2011/0153292 | A1* | 6/2011 | Lane et al. ............ 703/6 |
| 2011/0153293 | A1* | 6/2011 | Coldicott et al. ............ 703/6 |
| 2011/0153608 | A1* | 6/2011 | Lane et al. ............ 707/738 |
| 2011/0153610 | A1* | 6/2011 | Carrato et al. ............ 707/738 |
| 2011/0153636 | A1* | 6/2011 | Coldicott et al. ............ 707/769 |
| 2011/0153767 | A1* | 6/2011 | Coldicott et al. ............ 709/207 |
| 2011/0238610 | A1 | 9/2011 | Lee et al. |

OTHER PUBLICATIONS

Oracle Enterprise Repository Harvester User Guide, 10g Release 3 (10.3), Jul. 2009, Oracle Corporation.*

Ahmed et al., An Introduction to Topic Maps, Jul. 2005, pp. 1-15.*

The Moose Book: Subject, model, meta-model, meta-meta-model, http://www.themoosebook.org/book/internals/fame/subject-model-meta-model, Copyright 2010-2011, pp. 1-3.*

Bieberstein, Norbert, Robert G. Laird, and Keith Jones. Executing SOA: a practical guide for the service-oriented architect. IBM Press, 2008.*

Hatzigaidas, Athanasios, et al. "Topic Map Existing Tools: A Brief Review." ICTAMI 2004 (International Conference on Theory and Applications of Mathematics and Informatics). 2004.*

Sam Hunting et al. "XML topic maps: creating and using topic maps", Jul. 16, 2002.*

Justin Kelleher, "A Reusable Traceability Framework Using Patterns", University of Cape Town, ACM Digital Library, 2005, pp. 50-55.

Sharples et al., "The Design and Implementation of a Mobile Learning Resource", Educational Technology Research Group, University of Birmingham, ACM Digital Library, 2002, pp. 1-23.

Min Luo, "Tutorial 1: Common Business Components and Services Toward More Agile and Flexible Industry Solutions and Assets", 2008 IEEE Congress on Services Part II, pp. 11-12.

Ying Huang et al., "A Stochastic Service Composition Model for Business Integration", Proceeds of the International Conference on Next Generation Web Services Practices, 2005 IEEE Computer Society, pp. 1-8.

Pham et al., "Analysis of Visualisation Requirements for Fuzzy Systems", 2003 ACM, pp. 181-187.

Chen, D-W. et al.; "A P2P based Web service discovery mechanism with bounding deployment and publication"; Chinese Journal of Computers; vol. 28; No. 4; pp. 615-626; Apr. 2005.

Lee, J. et al.; "Semantic and Dynamic Web Service of SOA bsed Smart Robots using Web 2.0 Open API", 2008; Sixth International Conference on Software Engineering, Research, Management, and Application; pp. 255-260.

Demirkan, H. et al.; "Service-oriented technology and management: Perspectives on research and practice for the coming decade"; Electronic Commerce Research and Applications vol. 7 Issue 4; Jan. 2008; pp. 356-376.

Zdun, U. et al.; "Modeling Process-Driven and Service-Oriented Architectures Using Patterns and Pattern Primitives"; ACM Transactions on the Web; vol. 1 No. 3 Article 14; Sep. 2007; 44 pages.

Simoes, B. et al.; "Enterprise-level Architecture for Interactive Web-based 3D Visualization of Geo-referenced Repositories"; Association for Computing Machinery Inc. 978-1-60558-432-4/09/0006; Jun. 2009; pp. 147-154.

Kanakalata et al; Performance Opitimization of SOA based AJAX Application; 2009; pp. 89-93.

Annett et al.; "Building Highly-Interactive, Data-Intensive, REST Applications: The Invenio Experience"; 2008; pp. 1-15.

Arnold et al.; "Automatic Realization of SOA Deployment Patterns in Distributed Environments"; ICSOC 2008; LNCS 5364; 2008; pp. 162-179.

Building SOA applications with reusable assets, Part 1: Reusable assets, recipes, and patterns, "http://www.microsofttranslator.com/BV.aspx?ref=IE8Activity&a=http%3A%2F%2Fwww.ibm.com%2Fdeveloperworks%2Fcn%2Fwebservices%2Fws-soa-reuse1%2".

(56) References Cited

OTHER PUBLICATIONS

Building SOA applications with reusable assets, Part 2: SOA recipe reference example, "http://www.microsofttranslator.com/BV.aspx?ref=IE8Activity&a=http%3A%2F%2Fwww.ibm.com%2Fdeveloperworks%2Fcn%2Fwebservices%2Fws-soa-reuse2%2F".

Building SOA applications with reusable assets, Part 3: WS response template pattern, "http://www.microsofttranslator.com/BV.aspx?ref=IE8Activity&a=http%3A%2F%2Fwww.ibm.com%2Fdeveloperworks%2Fcn%2Fwebservices%2Fws-soa-reuse3%2 F".

"System and Method for Distributed Web Service Adaptation using Aspect oriented Programming", IBM Technical Disclosure Bulletin, Sep. 15, 2008, pp. 1-3.

Baum et al., "Mapping Requirements to Reusable Components using Design Spaces", 2000, Proceedings 4th International Conference on Requirements Engineering, pp. 159-167.

Hsiung et al., "VERTAF: An Application Framework for the Design and Verification of Embedded Real-Time Software", IEEE Transactions on Software Engineering, vol. 30, No. 10, Oct. 2004, pp. 656-674.

Robinson et al., "Finding Reusable UML Sequence Diagrams Automatically", IEE Software, 2004, pp. 60-67.

Jin et al., "Automated Requirements Elicitation: Combining a Model-Driven Approach with Concept Reuse", International Journal of Software Engineering and Knowledge Engineering, vol. 13, No. 1, 2003, pp. 53-82.

* cited by examiner

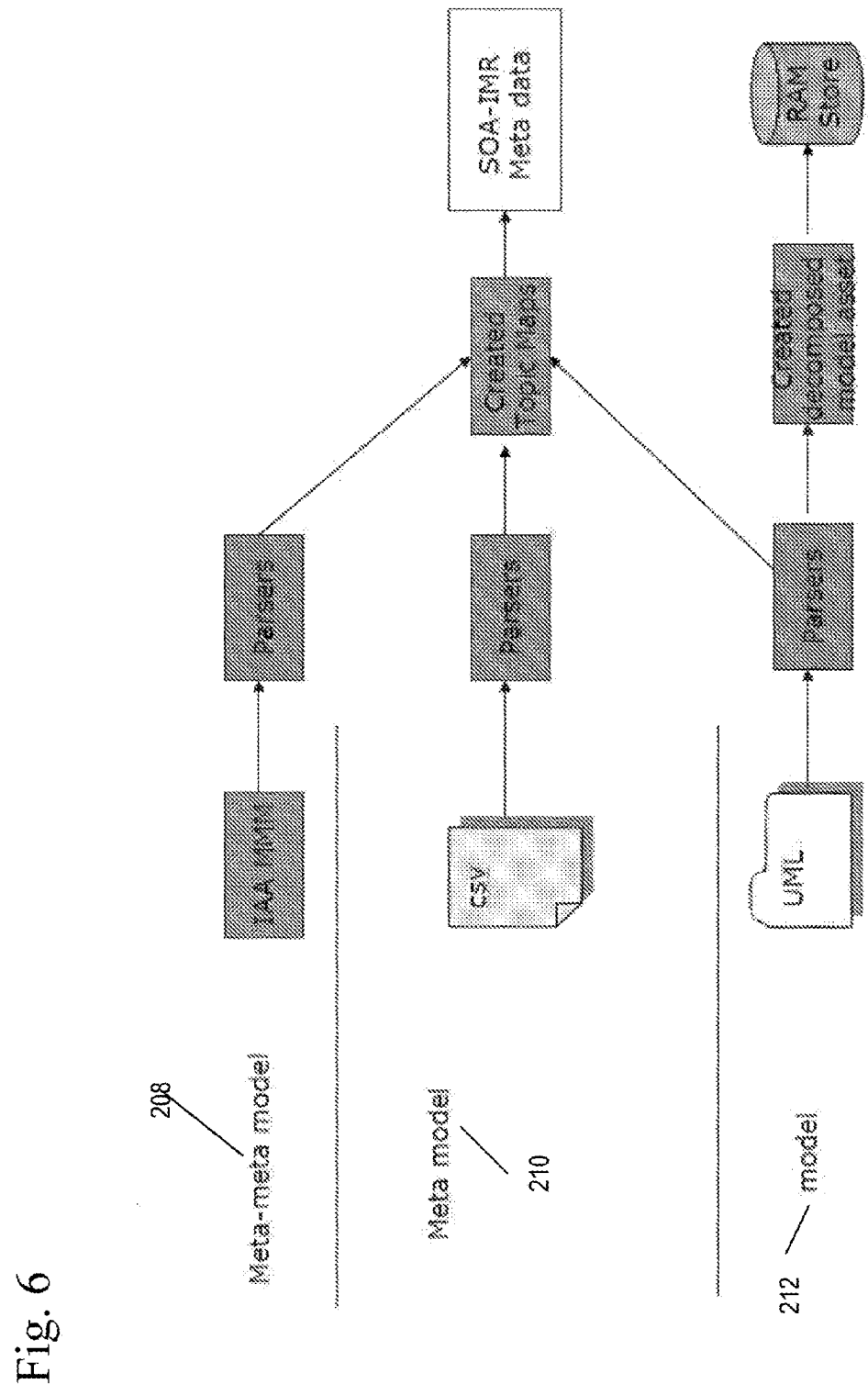

| Legend for Labels of Fig. 7A | |
|---|---|
| Node A: Enterprise model | C7: Enumeration item |
| A1: Relationship – enterprise model | C8: Operation |
| A2: E-r diagram – enterprise model | C9: Type – interface design model |
| A3: Type – enterprise model | C10: Exception |
| A4: Association – enterprise model | C11: Attribute – interface design model |
| A5: Attribute – enterprise model | C12: Enumeration |
| | C13: Association – interface design model |
| Node B: Requirements model | C14: Interface – interface design model |
| B1: Atomic data element | |
| B2: Metric | Node D: Product Model |
| B3: Use Case | D1: Property spec |
| B4: State – requirements model | D2: Product feature |
| B5: State machine – requirements model | D3: Relationship – product model |
| B6: Relationship – requirements model | D4: Constant spec |
| B7: System | D5: Product specification diagram |
| B8: Cbm category | D6: Role spec |
| B9: Activity diagram | D7: Request spec |
| B10: Atomic subject area | D8: Rule spec |
| B11: Measure data element | |
| B12: System service | Node E: Business model |
| B13: Project scope – requirements model | E1: Type – business model |
| B14: External activity | E2: State diagram |
| B15: Package – requirements model | E3: Collaboration diagram – business model |
| B16: Analytical subject area | E4: State – business model |
| B17: Focus area | E5: E-r diagram – business model |
| B18: Business activity | E6: Package – business model |
| B19: Cbm component | E7: Component – business model |
| B20: Actor | E8: Association – business model |
| | E9: Component Service |
| Node C: Interface design model | E10: Attribute – business model |
| C1: Package – interface design model | E11: Worked example – business model |
| C2: Relationship – interface design model | E12: State machine – business model |
| C3: Collaboration diagram – interface design model | |
| C4: Project scope – interface design model | Node F: Industry models taxonomy |
| C5: Worked example – interface design model | F1: Glossary |
| C6: Component – interface design model | F2: Verb |
| | F3: Specification framework |
| | F4: Attribute – specification framework |

Fig. 7B

FRAMEWORK TO POPULATE AND MAINTAIN A SERVICE ORIENTED ARCHITECTURE INDUSTRY MODEL REPOSITORY

BACKGROUND OF THE INVENTION

The present invention relates to meta models and more specifically to a framework to populate and maintain a service oriented architecture (SOA) industry model repository (IMR).

Service oriented architecture (SOA) is an enterprise scale information technology (IT) architecture for linking resources on demand. In SOA, resources are made available to participants in a value-net, enterprise, and/or line of business, typically spanning multiple applications within an enterprise or across multiple enterprises, where the primary structuring element for applications are a service, as opposed to subsystems, systems, or components. The service consists of a set of business aligned service definitions that collectively fulfill an organization's business processes and goals. These services can be choreographed into composite applications and can be invoked through internet based open protocols.

Industry standard models are usually very big and complex by their nature. Their sheer volume makes them hard to manage on a project implementation level. In order to populate the gigantic industry models, they need to broken up and parsed systematically and automatically.

Manually populating the repository, especially for the entire vertical industries, would be exhaustive, redundant and error prone. There is existing domain knowledge that can be leveraged, e.g. Multi-Model Mapper (MMM) for Insurance Application Architecture (IAA). MMM has already created mappings among various models, i.e. the mappings for processes, interfaces and data models.

A service or utility that collects key concepts, complex industry standard models, resources, assets, etc. in the enterprises' information from the SOA IMR and ties it all together does not, exist making knowledge transfer and reuse of resources and assets difficult. Therefore, there is a need for tools that automate the process of encoding arbitrarily complex knowledge structures and link them to information assets.

SUMMARY OF THE INVENTION

According to one embodiment of the present invention, a method and a system for building a service oriented architecture industry model repository is provided comprising: creating a meta-meta-meta model with a topic map based index; pre-populating the meta-meta-meta model with a topic map based index using the data from the physical asset repository and known relationships between topics, associations, and occurrences in topic maps within the meta model service; pre-populating an information model repository common meta-meta model comprising reusing a taxonomy specific to an industry vertical as a common ontology for the topic map based index; pre-populating the at least one topic map meta model with data specific to a particular topic or industry vertical from the physical asset repository; and pre-populating models of the at least one topic map meta model with data specific to a particular topic or industry vertical from the physical asset repository.

BRIEF DESCRIPTION OF THE SEVERAL VIEWS OF THE DRAWINGS

FIG. 6 shows a pre-population framework for a service oriented architecture industry model repository.

DETAILED DESCRIPTION OF THE INVENTION

Figure 1:
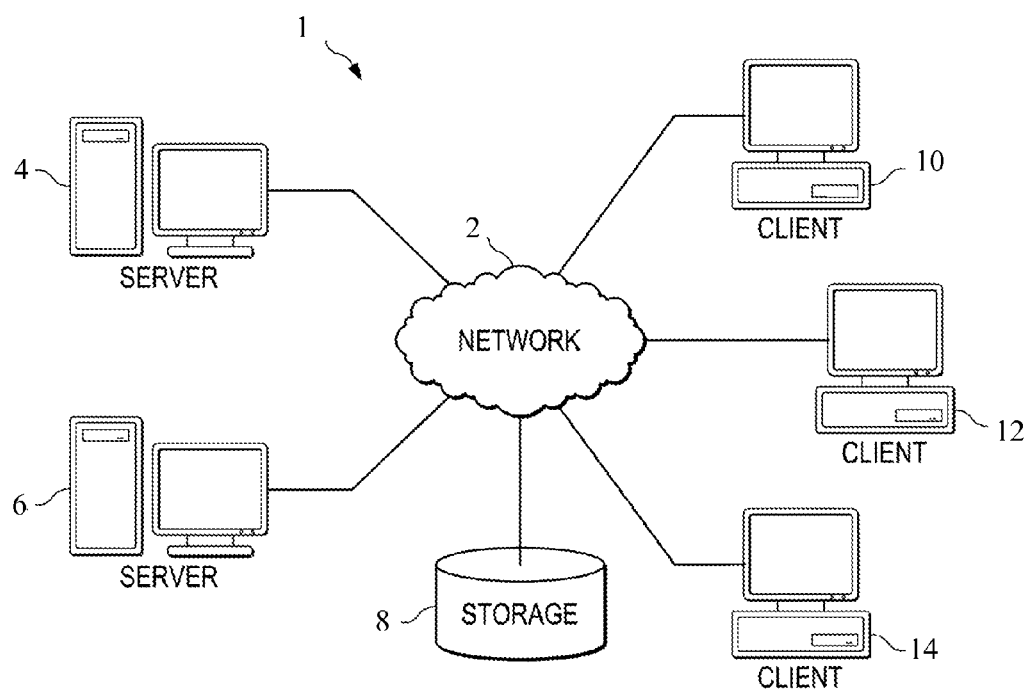
FIG. 1 is a computer network in which illustrative embodiments may be implemented.
Figure 2:
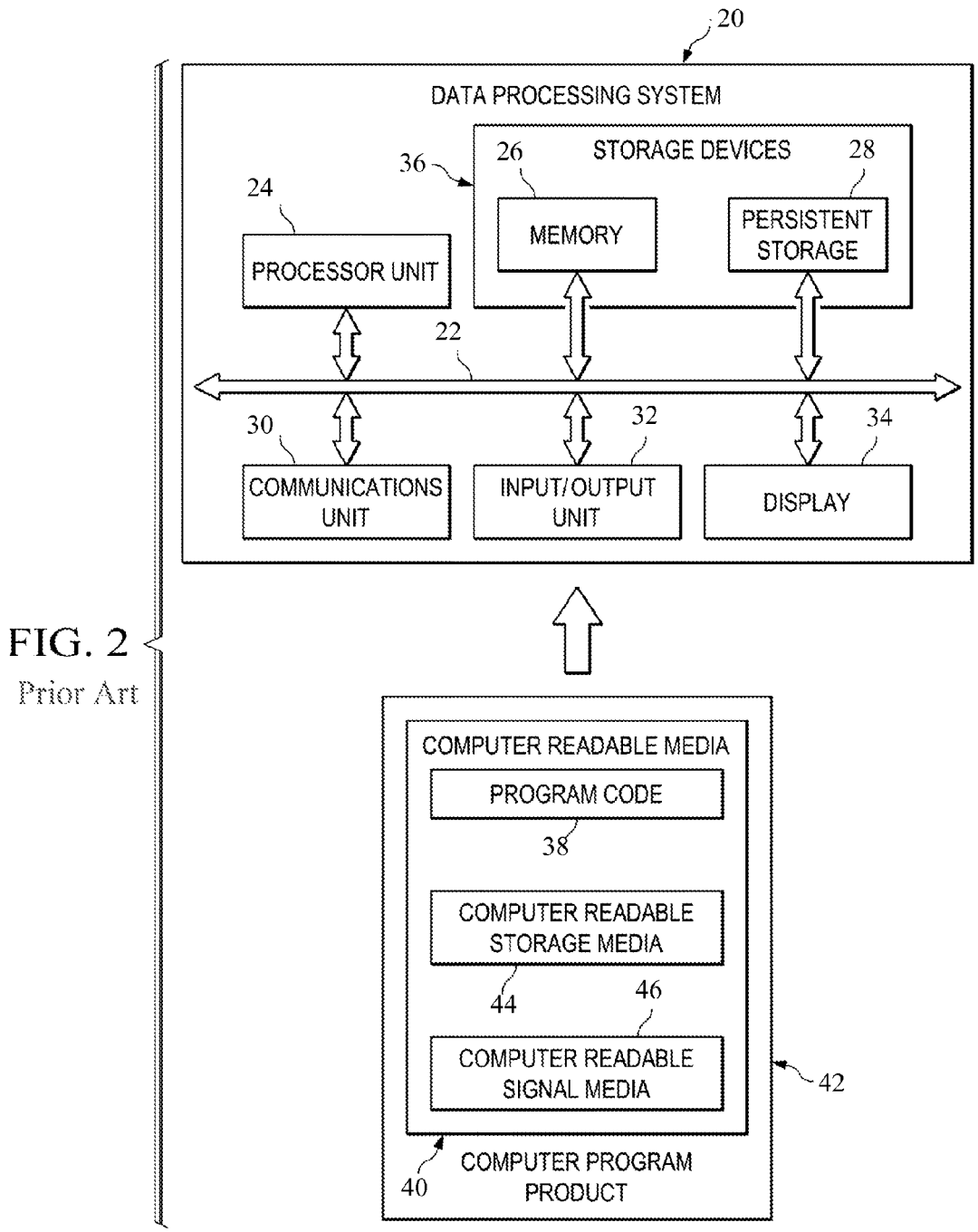
FIG. 2 is a data processing system in which illustrative embodiments may be implemented.

With reference now to the figures, and in particular, with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 1 is a network of computers in which the illustrative embodiments may be implemented. Network data processing system 1 contains network 2, which is the medium used to provide communication links between various devices and computers connected together within network data processing system 1. Network 2 may include connections, such as wire, wireless communication links, or fiber optic cables.

In the depicted example, server 4 and server 6 connect to network 2 along with storage unit 8. In addition, clients 10, 12, and 14 connect to network 2. Clients 110, 12, and 14 may be, for example, personal computers or network computers. In the depicted example, server 4 provides information, such as boot files, operating system images, and applications to clients 10, 12, and 14. Clients 10, 12, and 14 are clients to server 4 in this example. Network data processing system 1 may include additional servers, clients, and other devices not shown.

Program code located in network data processing system 1 may be stored on a computer recordable storage medium and downloaded to a data processing system or other device for use. For example, program code may be stored on a computer recordable storage medium on server 4 and downloaded to client 10 over network 2 for use on client 10.

In the depicted example, network data processing system 1 is the Internet with network 2 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 1 also may be implemented as a number of different types of networks, such as, for example, an intranet, a local area network (LAN), or a wide area network (WAN). FIG. 1 is intended as an example, and not as an architectural limitation, for the different illustrative embodiments.

With reference now to FIG. 2, a block diagram of a data processing system is shown in which illustrative embodiments may be implemented. Data processing system 20 is an example of a computer, such as server 4 or client 10 in FIG. 1, in which computer usable program code or instructions implementing the processes may be located for the illustrative embodiments. In this illustrative example, data processing system 20 includes communications fabric 22, which provides communications between processor unit 24, memory 26, persistent storage 28, communications unit 30, input/output (I/O) unit 32, and display 34.

Processor unit 24 serves to execute instructions for software that may be loaded into memory 26. Processor unit 24 may be a set of one or more processors, or may be a multi-processor core, depending on the particular implementation. Further, processor unit 24 may be implemented using one or more heterogeneous processor systems in which a main processor is present with secondary processors on a single chip. As another illustrative example, processor unit 24 may be a symmetric multi-processor system containing multiple processors of the same type.

Memory 26 and persistent storage 28 are examples of storage devices 36. A storage device is any piece of hardware that is capable of storing information, such as, for example, without limitation, data, program code in functional form, and/or other suitable information either on a temporary basis and/or a permanent basis. Memory 26, in these examples, may be, for example, a random access memory or any other suitable volatile or non-volatile storage device. Persistent storage 28 may take various forms depending on the particular implementation. For example, persistent storage 28 may contain one or more components or devices. For example, persistent storage 28 may be a hard drive, a flash memory, a rewritable optical disk, a rewritable magnetic tape, or some combination of the above. The media used by persistent storage 28 also may be removable. For example, a removable hard drive may be used for persistent storage 28.

Communications unit 30, in these examples, provides for communications with other data processing systems or devices. In these examples, communications unit 30 is a network interface card. Communications unit 30 may provide communications through the use of either or both physical and wireless communication links.

Input/output unit 32 allows for input and output of data with other devices that may be connected to data processing system 20. For example, input/output unit 32 may provide a connection for user input through a keyboard, a mouse, and/or some other suitable input device. Further, input/output unit 32 may send output to a printer. Display 34 provides a mechanism to display information to a user.

Instructions for the operating system, applications, and/or programs may be located in storage devices 36, which are in communication with processor unit 24 through communications fabric 22. In these illustrative examples the instructions are in a functional form on persistent storage 28. These instructions may be loaded into memory 26 for running by processor unit 24. The processes of the different embodiments may be performed by processor unit 24 using computer implemented instructions, which may be located in a memory, such as memory 26.

These instructions are referred to as program code, computer usable program code, or computer readable program code, that may be read and run by a processor in processor unit 24. The program code in the different embodiments may be embodied on different physical or tangible computer readable media, such as memory 26 or persistent storage 28.

Program code 38 is located in a functional form on computer readable media 40 that is selectively removable and may be loaded onto or transferred to data processing system 20 for running by processor unit 24. Program code 38 and computer readable media 40 form computer program product 42 in these examples. In one example, computer readable media 40 may be in a tangible form, such as, for example, an optical or magnetic disc that is inserted or placed into a drive or other device that is part of persistent storage 28 for transfer onto a storage device, such as a hard drive that is part of persistent storage 28. In a tangible form, computer readable media 40 also may take the form of a persistent storage, such as a hard drive, a thumb drive, or a flash memory that is connected to data processing system 20. The tangible form of computer readable media 40 is also referred to as computer recordable storage media. In some instances, computer readable media 40 may not be removable.

Alternatively, program code 38 may be transferred to data processing system 20 from computer readable media 40 through a communications link to communications unit 30 and/or through a connection to input/output unit 32. The communications link and/or the connection may be physical or wireless in the illustrative examples. The computer readable media also may take the form of non-tangible media, such as communication links or wireless transmissions containing the program code.

In some illustrative embodiments, program code 38 may be downloaded over a network to persistent storage 28 from another device or data processing system for use within data processing system 20. For instance, program code stored in a computer readable storage medium in a server data processing system may be downloaded over a network from the server to data processing system 20. The data processing system providing program code 38 may be a server computer, a client computer, or some other device capable of storing and transmitting program code 38.

The different components illustrated for data processing system 20 are not meant to provide architectural limitations to the manner in which different embodiments may be implemented. The different illustrative embodiments may be implemented in a data processing system including components in addition to, or in place of, those illustrated for data processing system 20. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 20 is any hardware apparatus that may store data. Memory 26, persistent storage 28 and computer readable media 40 are examples of storage devices in a tangible form.

In another example, a bus system may be used to implement communications fabric 22 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 26 or a cache such as found in an interface and memory controller hub that may be present in communications fabric 22.

Figure 3:
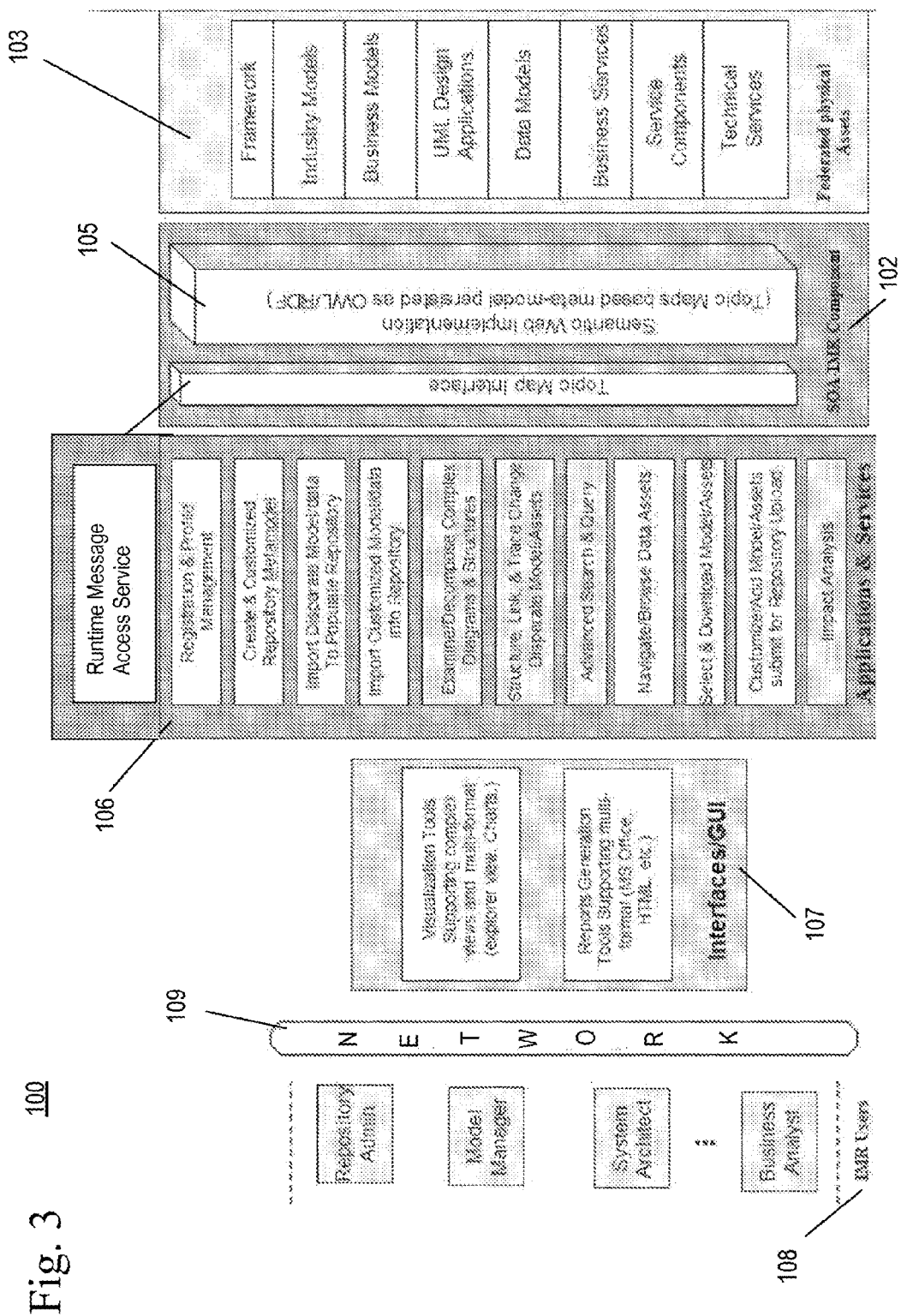
FIG. 3 shows an overview of an industry model repository (IMR) solution architecture system including a service oriented architecture (SOA) industry model repository (IMR) component.

FIG. 3 shows the IMR architecture system 100 which may be part of the network data processing system 1 shown in FIG. 1 includes a service oriented architecture (SOA) industry model repository (IMR) component 102. The SOA-IMR component 102 provides tools to facilitate the consumption and reuse of the model assets through topic map IMR meta model creation and topic map interface 104 and semantic web implementation 105 which represent and implement the IMR meta models using semantics provide by the OWL language. The SOA IMR component 102 is discussed in further detail in an application entitled, "SERVICE ORIENTED ARCHITECTURE INDUSTRY MODEL REPOSITORY META-MODEL WITH A STANDARD BASED INDEX" filed concurrently with the present application. This application is hereby incorporated by reference. Block 105 is described in greater detail below.

The IMR architecture system 100 includes federated physical model assets 103 that are stored in different types of repositories depending on the model driven framework tools and products that are being deployed by the system. The federated physical assets may include framework, industry models, business models, UML design applications, data models, business services, service components, and technical services. The federated physical assets are not limited to the assets shown in FIG. 3.

Applications and services 106 are provided to IMR users 108 through the network 109 using interfaces 107. The interfaces used by the IMR users 108 includes reports generation and tools supporting multi-formats and visualization tools supporting complex views. The applications and services 106 may include registration and profile management; creating and customizing repository meta model, importing customized and disparate model/data into the depository, examining/decomposing complex diagrams and structures, structure, link, and trace change disparate model/assets; advanced search and query, navigate/browse data assets; select and download model/assets, customize/add models/assets submit for repository upload; and impact analysis. The application and services are not limited to the assets shown in FIG. 3. The applications and services are described in greater detail in applications entitled "IMPLEMENTING SERVICE ORIENTED ARCHITECTURE INDUSTRY MODEL REPOSITORY USING SEMANTIC WEB TECHNOLOGIES", "MANAGING AND MAINTAINING SCOPE IN A SERVICE ORIENTED ARCHITECTURE INDUSTRY MODEL REPOSITORY", and "RECOGNITION OF AND SUPPORT FOR MULTIPLE VERSIONS OF AN ENTERPRISE CANONICAL MESSAGE MODEL" filed concurrently with the present application. These applications are hereby incorporated by reference. The interfaces 107 are further described in greater detail in an application entitled, "SERVICE ORIENTED ARCHITECTURE INDUSTRY MODEL REPOSITORY META-MODEL WITH A STANDARD BASED INDEX" filed concurrently and hereby incorporated by reference.

The IMR users 108 may include but are not limited to repository administrator, model manager, system architect, and business analyst.

Figure 4:
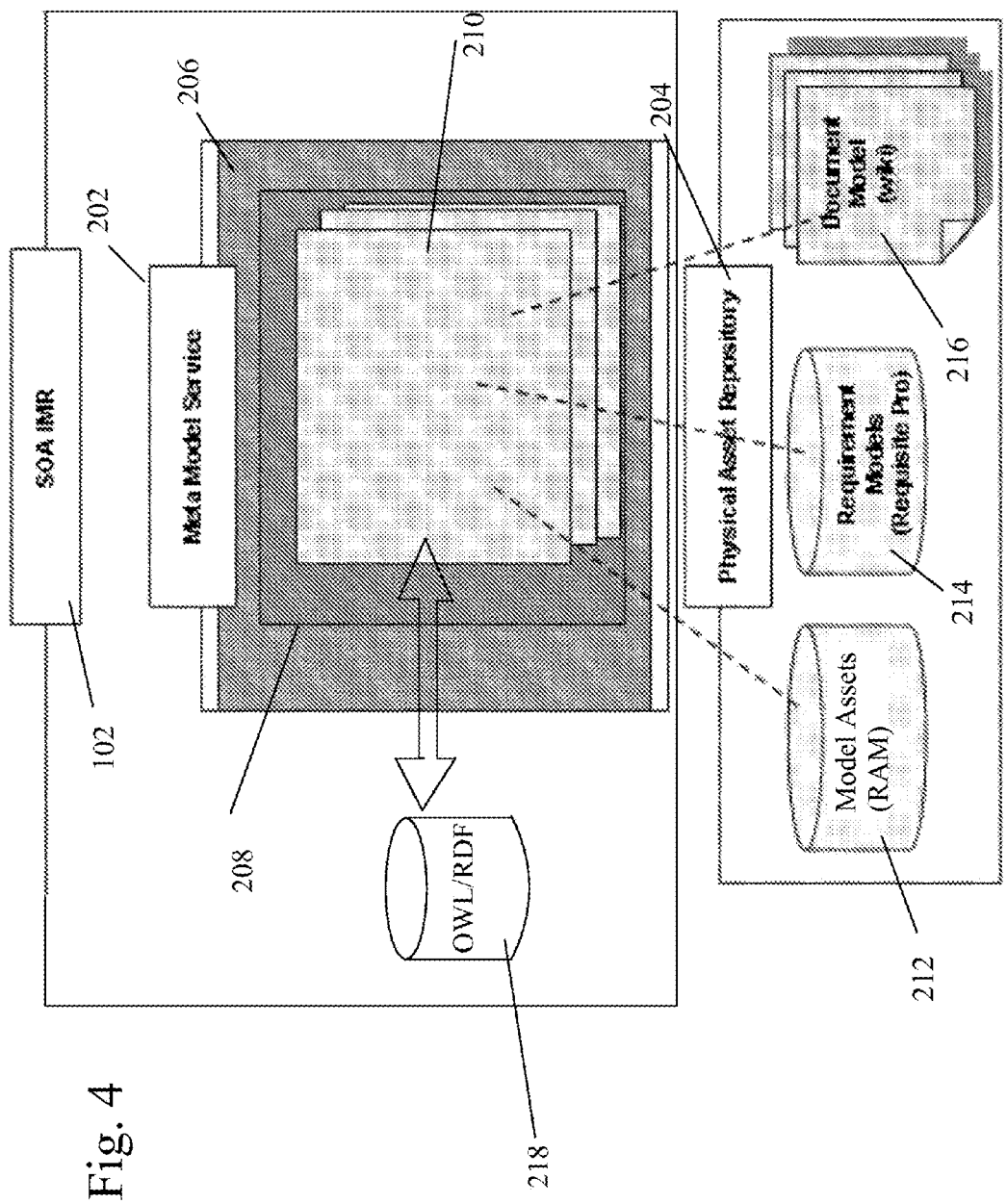
FIG. 4 shows an overview of a service oriented architecture (SOA) industry model repository (IMR) meta-model with OWL/RDF maps.

FIG. 4 shows a service oriented architecture (SOA) industry model repository (IMR) component 102 in greater detail. The SOA IMR component 102 includes a meta model service 202 associated with the physical asset repository. Within the meta model service 202 is a meta-meta-meta model 206 with a topic map based index, an information model repository (IMR) common meta-meta model 208 and at least one topic map meta model 210 with data specific to a particular topic or industry vertical. The topic map meta model 210 is associated with the physical asset repository 204 of model assets which includes but not limited to model assets (RAM) 212, requirement models 214, and document models (wiki) 216.

The internal meta model service 202 of the SOA IMR component 102 is the SOA IMR meta-model service using ISO Standard topic map meta models 210. Topic Maps map both web and real-world information resources, by reifying real-world resources as "subjects", and creating "topic" constructs to capture their characteristics and relationships with other topics and subjects. By using the topic maps meta models 206, 208, and 210 as the repository internal meta model, a common meta model service interface 202 allow users to programmatically access, manage, and maintain these meta models.

The SOA IMR meta model service 202 maps or implements the ISO topic map meta models 210 to a web ontology language (OWL) representation of the topic map. The industry model repository (IMR) provides the context for the implementation of the ISO topic map meta models 210 to the OWL representation of the topic maps. The OWL representation of the topic map is stored in a resource description framework (RDF) semantic web repository 218.

An embodiment of the present invention is a method of automating the process of encoding the service oriented architecture (SOA) with the kind of information that an industry model repository (IMR) needs, such as meta-meta data independent of the industry vertical, abstract information such as the Component Business Model (CBM) models information, business process/services model information, and entity model information and instance information. The tools for automating the process of encoding the service oriented architecture (SOA) with complex knowledge may also be used to represent the interrelation of roles, products, procedures, etc. that constitutes an enterprise and links them to corresponding documentations. Such tools make it easier for a user to navigate through a multidimensional topic space of knowledge before evaluating which information resources are relevant.

An embodiment of the present invention also provides a framework for automating the pre-population of an industry model repository (IMR) by leveraging the information in reusable assets. The framework also allows for the maintenance of the consistency of the data and the ability of automated index building for the IMR.

The information that is included in the pre-population of the SOA IMR includes but is not limited to the industry canonical ontology, vertical industry ontology, client model, client ontology, IMR common ontology, abstract information, and instance information. The industry canonical ontology and the vertical industry ontology are ontology or taxonomy that are part of the industry canonical model that does not include any client changes. The client model includes the client's proprietary model assets. The client ontology is the ontology or taxonomy that is part of the client model. The IMR common ontology is independent of any industry vertical or topic map meta model and based on the upper taxonomy of the architecture of the industry. The abstract information includes but is not limited to business process/services model information, entity model information, and CBM models information.

Figure 5:
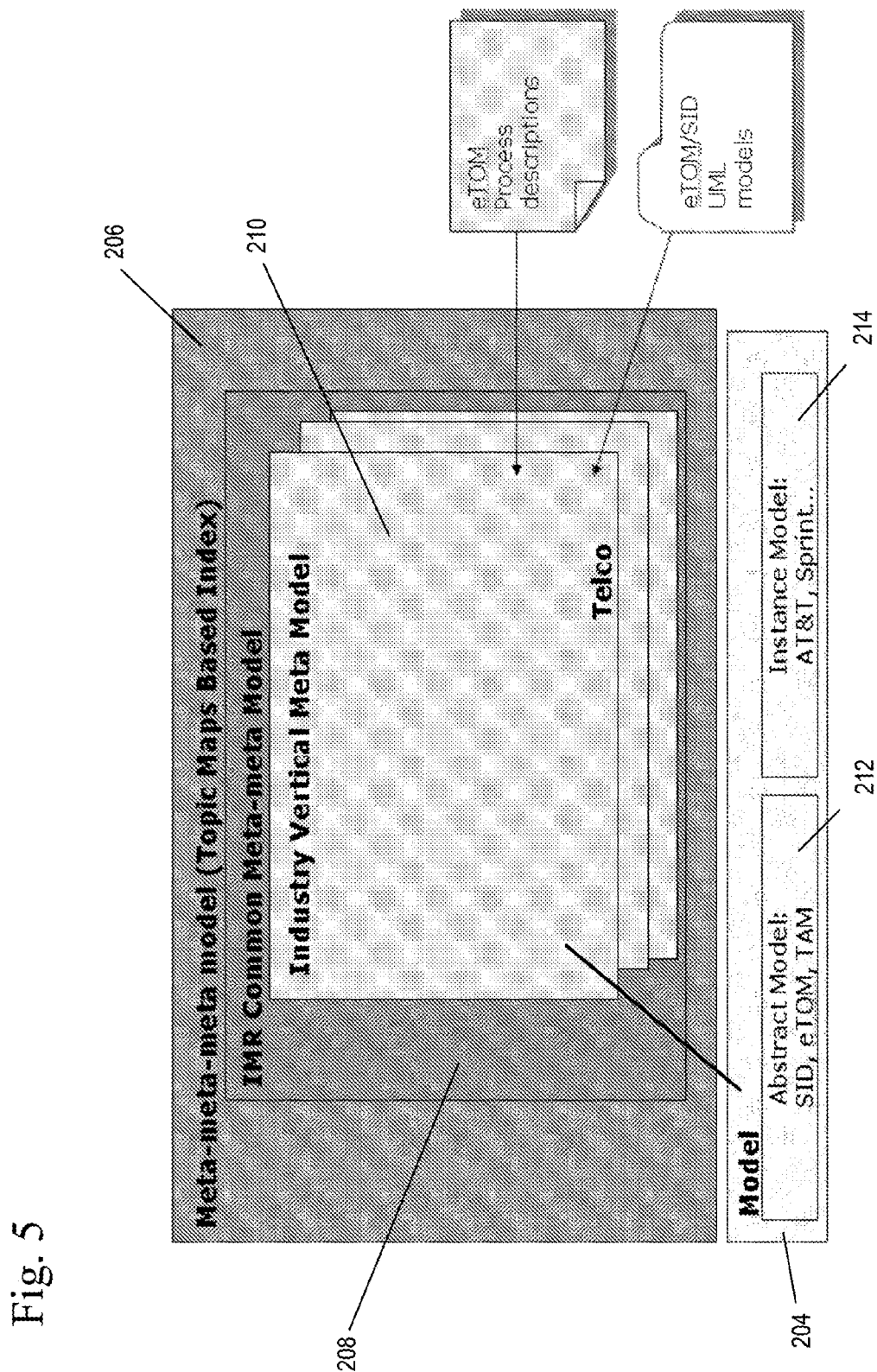
FIG. 5 shows an overview of the framework for pre-population of the SOA IMR.

The population of the SOA IMR is executed in a series of steps. FIGS. 5-6 shows the pre-population framework of the SOA IMR which are described briefly as follows:

1) Create the meta-meta-meta model (Topic Maps-Data Model (TMDM) Based Index) 206 of the SOA IMR:

The Topic Map Meta-Model is defined based primarily upon ISO 13250-2 Data Model to provide the most authoritative definition of the abstract syntax for Topic Maps. The TMDM normative specification is textual. Each topic is about a single subject. Subjects in Topic Map may be anything physical or conceptual. A machine addressable Topic (physical asset) will have a locator (e.g. a URL) while non-machine addressable subjects (e.g. Process model) will have an identifier (e.g. the URL of a page about the subject containing a figure of this Business Process or URL). Topics are equivalent to Resource Description Framework (RDF) Resources, describing elements in a web world. The RDF resources provide interoperability between applications and services 106 that exchange machine-understandable information on the Web. RDF uses XML to exchange basic descriptions of Web resources. On top of RDF a Web Ontology Language for Description Logics (OWL DL) is used to provide a language with both a well-defined semantics and set of language constructs including classes (topics), association, and occurrences that are required for describing meta models Web domain.

2) Pre-population of the SOA IMR meta-meta-meta model data using Topic Maps using a pre-existing OWL DL representation of the topic maps.

Figure 8:
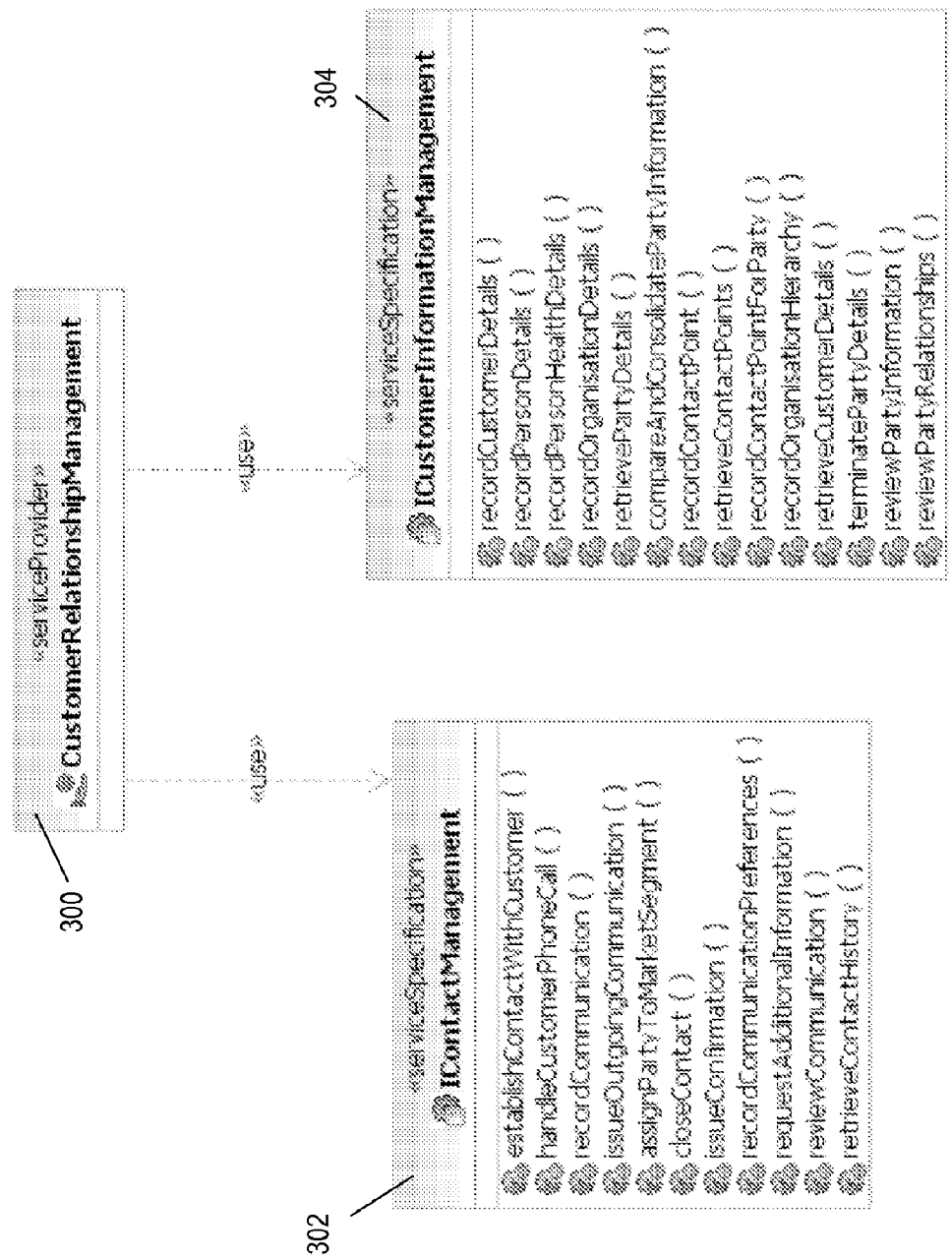
FIG. 8 shows a UML diagram for the population of instance models with parsed elements of the instance model.
Figure 9:
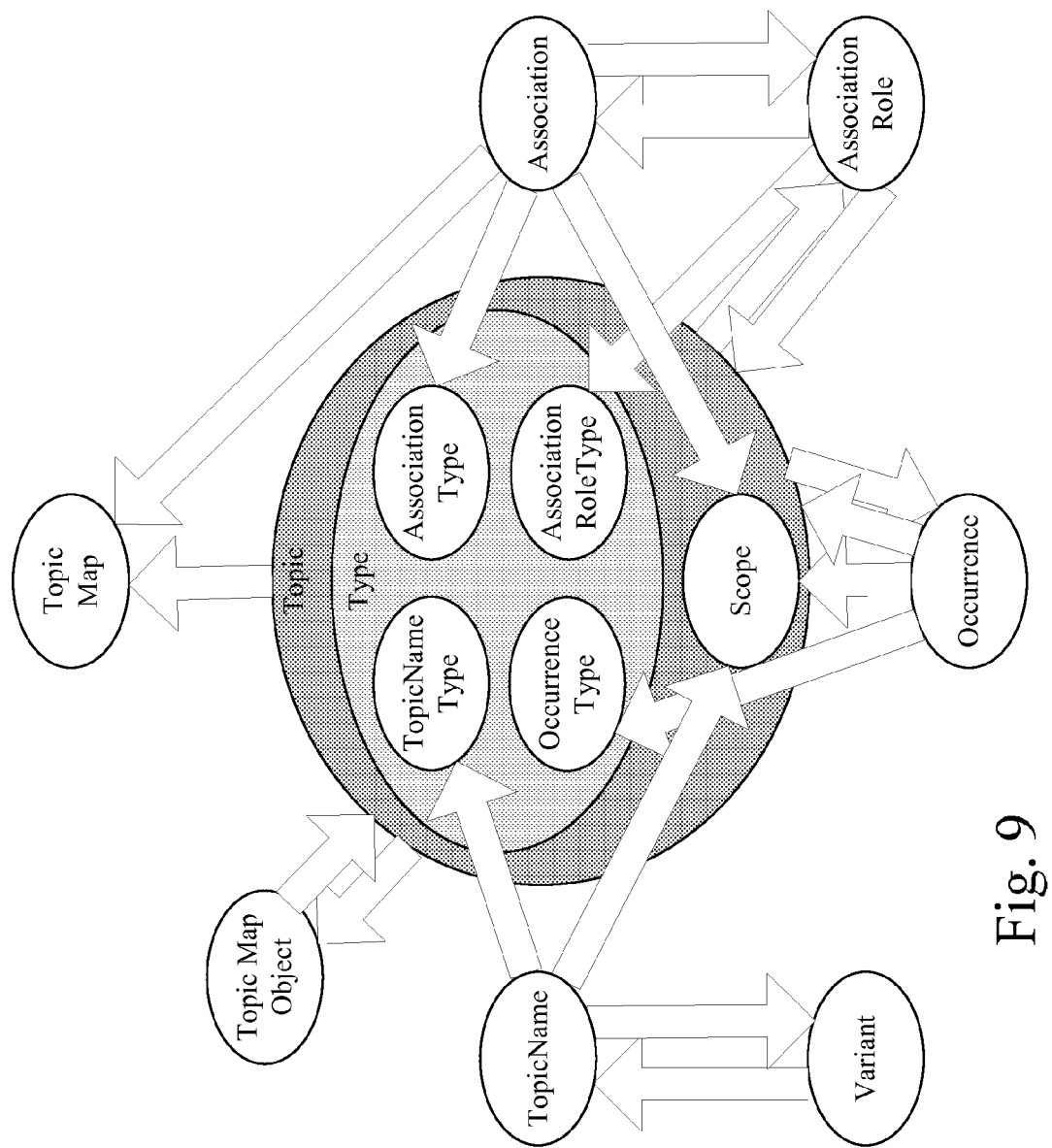
FIG. 9 shows an example of a topic map of the SOA IMR meta-meta-meta model.

The pre-existing OWL DL representation of the topic maps may be as shown in FIG. 8 with relationships between the topics, associations and occurrences defined.

3) Pre-population of the SOA IMR common meta-meta model data (208) automatically generated by a dedicated parser reuses a Multi-Model Mapper (MMM) insurance upper ontology as the SOA IMR common ontology. The Multi-Model Mapper (MMM) is a product sold by the IBM Corporation as the IBM® Industry Models Multi Model Mapper. Other ontologies may also be used. An example of the taxonomy used within the insurance upper ontology to populate the common meta-meta model data is shown in FIG. 7.

4) Pre-population of the vertical industry meta model data (210) automatically generated by a dedicated parser, which includes but not limited to IBM Insurance Application Architecture (IAA) MMM and IBM Banking Industry Enterprise Models (IFW) MMM, as well as Telco: IBM Enhanced Telecom Operations Map (eTOM) process definition spreadsheet and Domain Analysis. These integrated data (operational and informational), process, service and component models are consistently defined across business requirements, analysis and design.

5) Pre-population of the models for a particular industry vertical, often in a finer granularity (204) automatically generated by a dedicated parser, which include but not limited to Telco: eTOM process model, Shared Information Data (SID) UML models, Insurance: IAA interface design models (IDM) UML models; and Banking IFW. IDM is a sub-model within a given industry model. This may include an actual use case of requirements defined by the users 108.

For example to create an SOA IMR 102, in a first step, the meta-meta-meta model data 206 of the SOA IMR is built using the definitions in TMDM (based on ISO 13250-2), with each topic being a single subject. In a second step, the meta-meta-meta model data 206 is then pre-populated. The population of the meta-meta-meta model 206 is implemented by converting of the SOA IMR topic map meta model using a semantic technologies into a semantic web repository based on an OWL-DL representation of the topic map. Topic map constructs are the abstract collection of elements that are part of any topic map. Each topic represents a subject in the domain of discourse. The implementation of the IMR using semantic web technologies includes associating each instance of topic with exactly one subject. Topic Map Data Model (TMDM) defines these terms: a subject indicator, a subject identifier, a subject locator. Association which is multi-way relationship between one or more topics, and occurrences where an occurrence may be any descriptive information about a topic, including instances, and semantically is similar to UML attributes to the elements in the topics map based index 206. The implementation of the IMR using semantic web technologies is described in greater detail in an application entitled "IMPLEMENTING SERVICE ORIENTED ARCHITECTURE INDUSTRY MODEL REPOSITORY USING SEMANTIC WEB TECHNOLOGIES" filed concurrently. This application is hereby incorporated by reference.

In a third step, the SOA IMR common meta-meta model 208 data is pre-populated by a parser that parses index files of the industry model repository from a multi-model mapper to extract to the meta-meta model and use the meta-meta model to repopulate the topic map of the SOA IMR meta-meta model service component 202. The multi model mapper (MMM) uses a common taxonomy. While the multi model mapper does contain data specific to the insurance industry, this taxonomy may also be used a common taxonomy for any SOA IMR and does not tie the common meta-meta model 208 to a particular industry vertical. Since the meta-meta data is independent of any particular industry vertical, it may be used as the meta-meta data for all IMR instances.

Figure 7A:
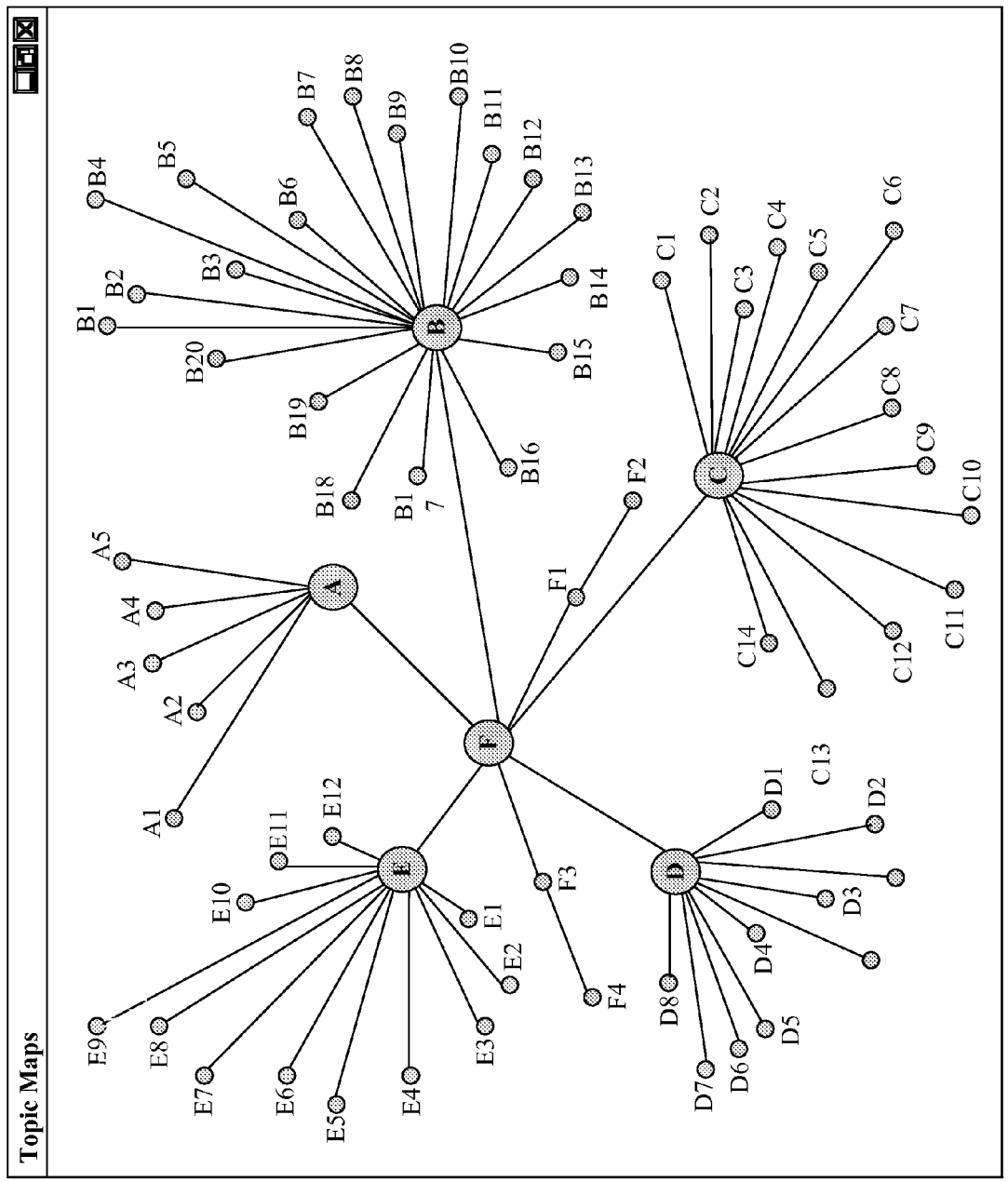
FIG. 7 (FIGS. 7A and 7B) shows a visualization of the industry model taxonomy.

FIG. 7 (e.g., FIGS. 7A and 7B) shows a visualization of the industry model taxonomy. In this case, the requirements meta-meta model is based on the SOA IMR common ontology. In order to pre-populate the SOA IMR meta-meta model 208, the parser reads in the index files that will be uploaded by the user 108 to the application and services component 108 and automatically creates a topic map, for example based on a Java stubs model used with the interface of the SOA IMR. This topic map creation allows reuse of an existing asset to pre-populate the SOA IMR meta-meta data model 208 that can be reused in every industry vertical.

In a fourth step, the meta model 210 for a particular industry vertical is pre-populated. The meta model 210 for a particular industry vertical is pre-populated by a parser that can read the information in the assets and convert the information to the topic map constructs, such as (but not limited to) eTOM, IAA, and IFW.

The eTOM model serves as a reference framework for categorizing all the business activities of a Telecom service provider. It categorizes them into different levels of detail according to their significance and priority for the business. The eTOM structure establishes the business language and foundation for the development and integration of Business Support Systems (BSS) and Operational Support Systems (OSS), respectively. eTOM provides a reference point and common language for service providers' internal process (re) engineering needs, partnerships, alliances, and general working agreements with other providers. For suppliers, the eTOM framework outlines potential boundaries of software components, and the required functions, inputs, and outputs that need to be supported by products using the common language of the service providers.

In a fifth step, the model data 204 is pre-populated. The pre-population of the model data includes abstract 212 and instance models 214. Abstract models 212 are models that are common to any particular industry vertical, such as insurance. The abstract models 212 build up over a period of time and represent aggregated lessons learned across a number of industries within a particular industry vertical. The lessons learned are commonly captured as UML models. To pre-populate the model data with the abstract models, a parser that pulls apart UML2 model assets into its constituent components and allow for fine grained occurrence relationships to be created between the SOA IMR meta model and the abstract model instant data. UML2 is an Eclipse Modeling Framework-based implementation of the Unified Modeling Language. The decomposed instance model is stored in a repository.

Instance models 214 are models that are for a particular industry within the vertical meta model. The instance models 214 are built and based on the abstract models and are customized to a particular industry within industry vertical meta model. The instance models 214 are encoded in the repository as models or UML models. The parser used for pulling apart the UML2 model assets of the abstract models may also be used for pulling part the instance models into its constituent components and allowing for fine grained occurrence relationships to be created between the SOA IMR meta model and the abstract model instance 212 data. The decomposed instance model is stored in a repository. Referring to FIG. 6, parsed elements of the instance model are a service provider of CustomerRelationshipManagement 300 which uses a service specification of IContactManagement 302 and a service specification of ICustomerInformationManagement 304.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any suitable computer usable or computer readable medium may be utilized. The computer-usable or computer-readable medium may be, for example but not limited to, an electronic, magnetic, optical, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a transmission media such as those supporting the Internet or an intranet, or a magnetic storage device. In the context of this document, a computer-usable or computer-readable medium may be any medium that can store the program for use by or in connection with the instruction execution system, apparatus, or device. The computer usable program code may be transmitted using any appropriate medium, including but not limited to the Internet, wireline, optical fiber cable, RF, etc.

Computer program code for carrying out operations of one or more embodiment of the present invention may be written in an object oriented programming language such as Java, Smalltalk, C++ or the like. However, the computer program code for carrying out operations of one or more embodiments of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention, for example as shown in FIGS. 1-9. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for generating topic maps for a business, the method comprising the steps of:
    storing in a database, at a first layer of abstraction, a plurality of model assets for a business conducting commerce in an industry, wherein the plurality of model assets are specific to the business and specify infrastructure computing resources and related design and documentation files;
    storing in a database one or more industry models for the industry, wherein each of the industry models are independent of the business, wherein each of the industry models defines relationships among assets commonly utilized in the industry; and
    one or more computing devices automatically generating a plurality of topic maps for the business, each of the topic maps representing information utilizing topics, associations, and occurrences, wherein said topics, associations, and occurrences together define characteristics and relationships existing among the model assets based at least in part on the relationships defined in the industry model and based at least in part on the stored model assets of the business.

2. The method of claim 1, further comprising the step of:
    one or more processors automatically populating data of the automatically generated topic maps utilizing information parsed from applicable ones of the plurality of model assets and from the industry model.

3. The method of claim 2, wherein the automatically generated and populated topic maps are stored in a second layer of abstraction utilized for semantically searching the model assets.

4. The method of claim 3, wherein indexes to the topic map are stored in a third layer of abstraction, wherein the third layer of abstraction comprises a set of industry independent application services developed for a computing framework, the computing framework having at least three layers of abstraction, which comprise the first layer, the second layer, and the third layer.

5. The method of claim 2, wherein the first layer of abstraction is a model level, and the second layer of abstraction is a meta model level.

6. The method of claim 1, wherein said topic maps and the topics, associations, and occurrences of each topic map conform to an International Organization for Standardization (ISO) standard for topic maps.

7. The method of claim 1, wherein each of the topics of the generated topic maps represent a symbol used within a topic map to represent one, and only one, subject, in order to allow statements to be made about the subject, wherein each subject for the business is for one of said model assets, wherein each of the occurrences of the generated topic maps represent a relationship between a subject and an information resource, and wherein each of the associations of the generated topic maps represent a relationship between one or more of the subjects.

8. The method of claim 1, wherein the database storing the one or more industry models is compliant with an Industry Models Multi Model Mapper (MMM), wherein compliance with the MMM is based on a most recent version of the MMM as existing on a filing date of this application.

9. A computer system for generating topic maps for a business comprising:
    at least one CPU and at least one computer readable storage media
    program instructions for storing in a database, at a first layer of abstraction, a plurality of model assets for a business conducting commerce in an industry, wherein the plurality of model assets are specific to the business and specify infrastructure computing resources and related design and documentation files;
    program instructions for storing in a database one or more industry models for the industry, wherein each of the industry models are independent of the business, wherein each of the industry models defines relationships among assets commonly utilized in the industry;
    program instructions for automatically generating a plurality of topic maps for the business, each of the topic maps representing information utilizing topics, associations, and occurrences, wherein said topics, associations, and occurrences together define characteristics and relationships existing among the model assets based at least in part on the relationships defined in the industry model and based at least in part on the stored model assets of the business;
    wherein the program instructions are stored on the at least one computer readable storage media for execution by the at least one CPU.

10. The system of claim 9, further comprising:
    program instructions for automatically populating data of the automatically generated topic maps utilizing information parsed from applicable ones of the plurality of model assets and from the industry model.

11. The system of claim 10, wherein the automatically generated and populated topic maps are stored in a second layer of abstraction utilized for semantically searching the model assets.

12. The system of claim 10, wherein indexes to the topic map are stored in a third layer of abstraction, wherein the third layer of abstraction comprises a set of industry independent application services developed for a computing framework, the computing framework having at least three layers of abstraction, which comprise the first layer, the second layer, and the third layer.

13. The system of claim 10, wherein the first layer of abstraction is a model level, and the second layer of abstraction is a meta model level.

14. The system of claim 9, wherein said topic maps and the topics, associations, and occurrences of each topic map conform to an International Organization for Standardization (ISO) standard for topic maps.

15. A computer program product for generating topic maps for a business, the computer program product comprising:
- a tangible computer readable storage device;
- program instructions for storing in a database, at a first layer of abstraction, a plurality of model assets for a business conducting commerce in an industry, wherein the plurality of model assets are specific to the business and specify infrastructure computing resources and related design and documentation files;
- program instructions for storing in a database one or more industry models for the industry, wherein each of the industry models are independent of the business, wherein each of the industry models defines relationships among assets commonly utilized in the industry;
- program instructions for automatically generating a plurality of topic maps for the business, each of the topic maps representing information utilizing topics, associations, and occurrences, wherein said topics, associations, and occurrences together define characteristics and relationships existing among the model assets based at least in part on the relationships defined in the industry model and based at least in part on the stored model assets of the business;
- wherein the program instructions are stored on the tangible computer readable storage device.

16. The computer program product of claim 15, further comprising:
- program instructions for automatically populating data of the automatically generated topic maps utilizing information parsed from applicable ones of the plurality of model assets and from the industry model.

17. The computer program product of claim 16, wherein the automatically generated and populated topic maps are stored in a second layer of abstraction utilized for semantically searching the model assets.

18. The computer program product of claim 16, wherein indexes to the topic map are stored in a third layer of abstraction, wherein the third layer of abstraction comprises a set of industry independent application services developed for a computing framework, the computing framework having at least three layers of abstraction, which comprise the first layer, the second layer, and the third layer.

19. The computer program product of claim 16, wherein the first layer of abstraction is a model level, and the second layer of abstraction is a meta model level.

20. The computer program product of claim 15, said topic maps and the topics, associations, and occurrences of each topic map conform to an International Organization for Standardization (ISO) standard for topic maps.

* * * * *